Patented Sept. 26, 1944

2,358,893

UNITED STATES PATENT OFFICE 2,358,893

PREPARATION OF SCHIFF'S BASES

John R. Vincent, Wilmington, Del., assignor to E. I. du Pont de Nemours & Company, Wilmington, Del., a corporation of Delaware No Drawing. Application October 14, 1943, Serial No. 506,216

12 Claims. (Cl. 260—509)

This invention relates to the preparation of Schiff's bases and more particularly to the preparation of alkali metal salts of sulfonated Schiff's bases, derived from hydroxy aromatic aldehydes and aliphatic diamines.

The di-alkali metal sulfonates of the Schiff's bases, obtained from aromatic hydroxy aldehydes and aliphatic primary diamines, are valuable compounds for deactivating catalytically active metals, such as copper, in organic substances, as shown in Patent 2,285,259 to Downing et al. They are of particular value in rubber latex and other aqueous dispersions of rubber and like materials.

It is known that Schiff's bases, formed by the condensation of an aromatic aldehyde with an aromatic amine, can be sulfonated and the product readily recovered by cooling the reaction mass. When it is attempted to prepare the sulfonated Schiff's base, derived from a hydroxy aromatic aldehyde and an aliphatic diamine, by the same method, the sulfonation product is not precipitated on cooling the reaction mass and, when the reaction mass is diluted with water or ice, the sulfonated aromatic aldehyde is obtained rather than the sulfonated Schiff's base. If the diluted reaction mass is rendered alkaline with a strong base, the precipitated sulfonated aldehyde re-dissolves and the desired product is not obtained.

For the above reasons, it has heretofore been considered necessary, in order to obtain the sulfonated Schiff's base from the condensation product of a hydroxy aromatic aldehyde with an aliphatic diamine, to condense the aldehyde with an aromatic amine, sulfonate the resulting Schiff's base, hydrolyze the sulfonated Schiff's base to obtain the sulfonated aldehyde and then to condense the sulfonated aldehyde with the aliphatic diamine. I have made the discovery that the Schiff's bases, derived from hydroxy aromatic aldehydes and aliphatic primary diamines, can be directly sulfonated and the di-alkali metal sulfonate thereof obtained by a simple method provided that the conditions are controlled within a certain range.

It is an object of the present invention to provide a method for producing the alkali metal sulfonates of Schiff's bases from the condensation products of hydroxy aromatic aldehydes and aliphatic primary diamines. Another object is to provide a new and improved method of producing the di-alkali metal salts of sulfonated Schiff's bases derived from hydroxy aromatic aldehydes and aliphatic primary diamines. Further objects are to provide new compositions of matter and to advance the art. Still other objects will appear hereinafter.

The above and other objects may be accomplished in accordance with my invention which comprises sulfonating the Schiff's base, obtained by the condensation of a hydroxy aromatic aldehyde with an aliphatic primary diamine, dissolving the sulfonation mixture in water while maintaining the temperatures below 100° C., adding sufficient basic alkali metal compound to increase the pH of the solution to at least 6, adjusting the pH of the solution to between 6 and 8.5 and then separating the alkali metal sulfonate of the Schiff's base from the solution. I have found that, by this process, I am able to obtain high yields of the di-alkali metal sulfonate of the Schiff's base. If the pH of the solution is outside of the specified range when separation of the product from the solution is attempted, the desired product is not obtained. If the pH is below 6, the products obtained are the aliphatic diamine and the sulfonated aldehyde or its alkali metal salt. If the pH is above 8.5, no product separates, but instead, there is obtained a solution of the tetrasodium salt of the sulfonated Schiff's base which tetrasodium salt is of no value for my purposes.

The Schiff's bases, which are to be sulfonated in accordance with my invention, are those obtained by the condensation of hydroxy aromatic aldehydes with aliphatic primary diamines. Preferably, the hydroxy group and the aldehyde group are bonded directly to adjacent ring carbon atoms. The aliphatic primary diamine, from which the Schiff's base is derived, is an aliphatic diamine in which both amino groups are primary amino groups. My present invention is primarily concerned with the preparation of di-alkali metal sulfonates of the Schiff's bases, derived from hydroxy aromatic aldehydes and aliphatic primary diamines, disclosed in Patent 2,285,259 to Downing et al.

The Schiff's base may be sulfonated by well known methods, such as that disclosed in Blav, M. 18, 126; 1897. Generally, at least 2 moles of sulfuric acid should be employed for each mole of the Schiff's base. I prefer to employ from 0.73 to 7.5 parts by weight of sulfuric acid to 1 part of the Schiff's base, which corresponds to about 2 to about 20 moles of sulfuric acid per mole of Schiff's base. Also, the sulfonation will generally be carried out at temperatures of from about 50° C. to about 160° C.

When the sulfonation is complete, the reaction mixture is dissolved in water while maintaining the temperature below 100° C. Preferably, this is done by pouring the reaction mixture on the desired quantity of ice. The final product is admixed with sodium sulfate, formed as a result of the subsequent neutralization. The proportion of sodium sulfate in the mixture will be dependent upon the amount of water with which the reaction mixture is diluted. Hence, the amount of ice or water, which is employed in the dilution step, will depend upon the desired composition of the resulting mixture. Generally, I prefer to employ from about 5 to about 25 parts by weight of ice or water for each part of the Schiff's base.

After the reaction mixture has been diluted, it is then treated with a basic alkali metal compound in an amount sufficient to increase the pH to at least 6 and preferably to a pH of between 6 and 8.5. If desired, an excess of alkali metal compound may be employed and then a strong non-oxidizing mineral acid may be added to bring the pH to between 6 and 8.5. Within this range, there is an optimum pH for each individual compound which will produce the maximum yield. If the neutralization is carried out at low temperatures, such as room temperatures and below, the product precipitates in a gelatinous condition which renders separation of the product from the solution extremely difficult. However, if the neutralization is carried out while maintaining the solution between 60° C. and 100° C., and preferably between 70° C. and 85° C., the product is precipitated in a readily filterable form. If, at the same time, an excess of alkali is employed and the pH of the solution is brought back to between 6 and 8.5 by a strong non-oxidizing acid, such as sulfuric acid, the product is in the most easily filterable condition.

In order to more fully illustrate my invention, the advantageous results to be obtained thereby and the preferred methods of carrying the same into effect, the following examples are given:

Example I

The sulfonation of disalicylal ethylene diamine was carried out in a manner similar to the literature method for sulfonating salicylal aniline (Blav, M. 18, 126; 1897). 50 parts of disalicylal ethylene diamine was added slowly, to keep the temperature at about 60° C., to 250 parts of well agitated concentrated sulfuric acid, and then heated for one hour on a steam bath. The mixture was then cooled to 10° C. (When salicylal aniline is used, a precipitate of sulfonated salicylal aniline is formed at this point). No precipitate is formed when starting with salicylal ethylene diamine. The mixture was poured onto 685 parts of ice. A white precipitate formed, which was not sulfonated disalicylal ethylene diamine, sulfonated disalicylal ethylene diamine being yellow. The mixture was cooled in an ice bath and sodium hydroxide (30%) was added until solution was complete (pH<4). Then salt was added to cause precipitation. The product (61.5 parts) was a white solid consisting of about 80% sodium salicylaldehyde sulfonate and 20% sodium sulfate and sodium bisulfate. None of the desired disodium salt of disulfodisalicylal ethylene diamine was obtained.

Example II

Disalicylal ethylene diamine, 305 parts, was added to 1000 parts of well agitated sulfuric acid (monohydrate) at such a rate that the temperature rose to 120° C. The stirring was continued for 40 minutes. The temperature was allowed to drop to 100° C. and then kept at this point for the remainder of the 40 minute period. The sulfonation mixture was then poured onto 3300 parts of ice. Sodium hydroxide solution (30%) was added until all the white precipitate had gone into solution and then until a yellow precipitate was formed (pH 7.5). This precipitate was gelatinous and was very difficult to filter. It was dried at 100° C. The yield was 820 parts of a product consisting of 46% of the disodium salt of disulfodisalicylal ethylene diamine and 54% sodium sulfate.

In an identical experiment, an excess of sodium hydroxide was added, which caused the yellow precipitate to dissolve. Addition of sulfuric acid until the pH was reduced to 7.5 reprecipitated the product.

Example III

This experiment was carried out in exactly the same manner as Example II, up to the addition of the sodium hydroxide. The acid solution was heated to 80° C. and then the sodium hydroxide solution (30%) was added slowly, with stirring, until the pH had reached 7.5. The solution was allowed to cool to room temperature while the stirring was continued. The yellow product filtered quite readily. Yield=652 parts consisting of 71% of the disodium salt of disulfodisalicylal ethylene diamine and 29% sodium sulfate. The proportion of the sodium sulfate may be increased by decreasing the amount of ice used to drown the sulfonation mass, and may be decreased by increasing the amount of ice. Increase in the amount of ice used, also tends to decrease the yield of the precipitated sodium salt of the sulfonated Schiff's base.

Example IV

This experiment was carried out just as in Example III, except that sodium hydroxide (30%) was added until the yellow precipitate has completely dissolved. Then 30% $H_2SO_4$ was added slowly until the pH dropped to 7.5. The mixture was cooled to room temperature and filtered as before. The yield was approximately the same as in Example III. Though the product from Example III was filterable, the product from this experiment was even more easily filtered than the one from the previous example.

Example V

Following the same procedure as in Example III, 50 parts of salicylal propylene diamine was added to 164 parts of monohydrate and then the mixture was poured onto 550 parts of ice. The solution was neutralized with sodium hydroxide to a pH of 7.5. The yield was 85.5 parts of the disodium salt of disulfo-salicylal propylene diamine containing considerable amounts of sodium sulfate.

It will be understood that the foregoing examples are given for illustrative purposes only and that various modifications and variations may be made therein without departing from the spirit or scope of my invention. For example, other Schiff's bases, particularly those disclosed in Patent 2,285,259, may be treated by this process. Particularly desirable compounds have been obtained from Disalicylal-1,2-butylene diamine
Disalicylal-2,3-butylene diamine
Disalicylal tetramethylene diamine
Disalicylal trimethylene diamine
The disalicylal-amylene diamines
The disalicylal-heptylene diamines
The disalicylal-hexylene diamines
The disalicylal-octylene diamines
1-hydroxy-2-naphthol propylene diamine
2-hydroxy-1-naphthol propylene diamine
2-hydroxy-3-naphthol ethylene diamine
Di-(2-hydroxy-5-methyl-benzal)-ethylene diamine Also, the alkyl substituted derivatives or homologues of the above compounds may be sulfonated by this process.

It will thus be seen that, by my invention, it is possible to obtain the di-alkali metal sulfonates of the Schiff's bases, derived from hydroxy aromatic aldehydes and aliphatic primary diamines, by a simple and direct method which avoids steps heretofore considered necessary. Accordingly, substantial economies in time, labor and costs are obtained by the use of my invention.

I claim:

1. The process of preparing an alkali metal sulfonate of a Schiff's base which is the condensation product of a hydroxy aromatic aldehyde and an aliphatic primary diamine which comprises sulfonating the Schiff's base, dissolving the sulfonation reaction mixture in water while maintaining the temperatures below 100° C., adding sufficient basic alkali metal compound to increase the pH of the solution to at least 6, adjusting the pH of the solution to between 6 and 8.5 and then separating the alkali metal sulfonate of the Schiff's base from the solution.

2. The process of preparing an alkali metal sulfonate of a Schiff's base which is the condensation product of a hydroxy aromatic aldehyde and an aliphatic primary diamine which comprises sulfonating the Schiff's base, dissolving the sulfonation reaction mixture in water while maintaining the temperatures below 100° C., adding sufficient basic alkali metal compound to increase the pH of the solution to between 6 and 8.5 and then separating the alkali metal sulfonate of the Schiff's base from the solution.

3. The process of preparing an alkali metal sulfonate of a Schiff's base which is the condensation product of a hydroxy aromatic aldehyde and an aliphatic primary diamine which comprises sulfonating the Schiff's base, dissolving the sulfonation reaction mixture in water while maintaining the temperatures below 100° C., adjusting the temperature to between 60° C. and 100° C., adding sufficient basic alkali metal compound to increase the pH of the solution to at least 6, adjusting the pH of the solution to between 6 and 8.5, cooling the resulting mixture and then separating the alkali metal sulfonate of the Schiff's base from the solution.

4. The process of preparing an alkali metal sulfonate of a Schiff's base which is the condensation product of a hydroxy aromatic aldehyde and an aliphatic primary diamine which comprises sulfonating the Schiff's base, dissolving the sulfonation reaction mixture in water while maintaining the temperatures below 100° C., adjusting the temperature to between 60° C. and 100 °C., adding sufficient basic alkali metal compound to increase the pH of the solution to between 6 and 8.5, cooling the resulting mixture and then separating the alkali metal sulfonate of the Schiff's base from the solution.

5. The process of preparing an alkali metal sulfonate of a Schiff's base which is the condensation product of a hydroxy aromatic aldehyde and an aliphatic primary diamine which comprises sulfonating the Schiff's base, dissolving the sulfonation reaction mixture in water while maintaining the temperatures below 100° C., adjusting the temperature to between 60° C. and 100° C., adding sufficient basic alkali metal compound to render the solution alkaline and to dissolve the sulfonated Schiff's base, adding a strong non-oxidizing acid in an amount sufficient to bring the pH of the solution to between 6 and 8.5, cooling the resulting mixture and then separating the alkali metal sulfonate of the Schiff's base from the solution.

6. The process of preparing a sodium sulfonate of a Schiff's base which is the condensation product of a hydroxy aromatic aldehyde and an aliphatic primary diamine which comprises sulfonating the Schiff's base, dissolving the sulfonation reaction mixture in water while maintaining the temperatures below 100° C., adding sufficient sodium hydroxide to increase the pH of the solution to at least 6, adjusting the pH of the solution to between 6 and 8.5 and then separating the sodium sulfonate of the Schiff's base from the solution.

7. The process of preparing a sodium sulfonate of a Schiff's base which is the condensation product of a hydroxy aromatic aldehyde and an aliphatic primary diamine which comprises sulfonating the Schiff's base, dissolving the sulfonation reaction mixture in water while maintaining the temperatures below 100° C., adjusting the temperature to between 60° C. and 100° C., adding sufficient sodium hydroxide to increase the pH of the solution to at least 6, adjusting the pH of the solution to between 6 and 8.5, cooling the resulting mixture and then separating the sodium sulfonate of the Schiff's base from the solution.

8. The process of preparing a sodium sulfonate of a Schiff's base which is the condensation product of a hydroxy aromatic aldehyde and an aliphatic primary diamine which comprises sulfonating the Schiff's base, dissolving the sulfonation reaction mixture in water while maintaining the temperatures below 100° C., adjusting the temperature to between 60° C. and 100° C., adding sufficient sodium hydroxide to increase the pH of the solution to between 6 and 8.5, cooling the resulting mixture and then separating the sodium sulfonate of the Schiff's base from the solution.

9. The process of preparing a sodium sulfonate of a Schiff's base which is the condensation product of a hydroxy aromatic aldehyde and an aliphatic primary diamine which comprises sulfonating the Schiff's base, dissolving the sulfonation reaction mixture in water while maintaining the temperatures below 100° C., adjusting the temperature to between 60° C. and 100° C., adding sufficient sodium hydroxide to render the solution alkaline and to dissolve the sulfonated Schiff's base, adding a strong non-oxidizing acid in an amount sufficient to bring the pH of the solution to between 6 and 8.5, cooling the resulting mixture and then separating the sodium sulfonate of the Schiff's base from the solution.

10. The process of preparing a sodium sulfonate of a Schiff's base which is the condensation product of a hydroxy aromatic aldehyde and an aliphatic primary diamine which comprises sulfonating the Schiff's base, dissolving the sulfonation reaction mixture in water while maintaining the temperatures below 100° C., adjusting the temperature to between 60° C. and 100° C., adding sufficient sodium hydroxide to render the solution alkaline and to dissolve the sulfonated Schiff's base, adding sulfuric acid in an amount sufficient to bring the pH of the solution to between 6 and 8.5, cooling the resulting mixture and then separating the sodium sulfonate of the Schiff's base from the solution.

11. The process of preparing the disodium salt of disulfodisalicylal ethylene diamine which comprises sulfonating disalicylal ethylene diamine, dissolving the reaction mixture in water while maintaining the temperatures below 100° C., adjusting the temperature to between 60° C. and 100° C., adding sufficient sodium hydroxide to increase the pH of the solution to at least 6, adjusting the pH of the solution to between 6 and 8.5, cooling the resulting mixture and then separating the disodium salt of disulfodisalicylal ethylene diamine from the solution.

12. The process of preparing the disodium salt of disulfodisalicylal ethylene diamine which comprises sulfonating disalicylal ethylene diamine, dissolving the reaction mixture in water while maintaining the temperatures below 100° C., adjusting the temperature to between 60° C. and 100° C., adding sufficient sodium hydroxide to increase the pH of the solution to between 6 and 8.5, cooling the resulting mixture and then separating the disodium salt of disulfodisalicylal ethylene diamine from the solution.

JOHN R. VINCENT.